United States Patent
Lim (10) Patent No.: US 9,726,927 B2
(45) Date of Patent: Aug. 8, 2017

(54) USER TERMINAL AND DISPLAY DEVICE THEREOF

(75) Inventor: Sil Kyu Lim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 13/568,668

(22) Filed: Aug. 7, 2012

(65) Prior Publication Data

US 2013/0057485 A1 Mar. 7, 2013

(30) Foreign Application Priority Data

Sep. 2, 2011 (KR) .................. 10-2011-0088877

(51) Int. Cl.
  *G06F 3/041* (2006.01)
  *G02F 1/1335* (2006.01)
  *H04M 1/02* (2006.01)
  *G09G 3/00* (2006.01)
  *G02F 1/1333* (2006.01)

(52) U.S. Cl.
  CPC .... *G02F 1/133512* (2013.01); *H04M 1/0266* (2013.01); *G02F 2001/133331* (2013.01); *G06F 3/041* (2013.01); *G09G 3/00* (2013.01)

(58) Field of Classification Search
  CPC ................................ G06F 1/1333; G09G 3/00
  USPC ............................................. 345/173; 9/173
  See application file for complete search history.

(56) References Cited

U.S. PATENT DOCUMENTS

| | | | |
|---|---|---|---|
| 2003/0107127 A1* | 6/2003 | Murai | G02F 1/136204 257/724 |
| 2005/0062693 A1* | 3/2005 | Suzuki | G09G 3/3216 345/76 |
| 2007/0222912 A1* | 9/2007 | Sato | G02F 1/133528 349/58 |
| 2009/0015732 A1* | 1/2009 | Yabuta | G09G 3/3611 349/1 |
| 2009/0231507 A1 | 9/2009 | Oohira | |
| 2011/0032193 A1* | 2/2011 | Szalkowski | G06F 3/044 345/173 |
| 2011/0032223 A1* | 2/2011 | Okamoto | G02F 1/167 345/204 |
| 2011/0050668 A1* | 3/2011 | Park | G09G 3/3426 345/211 |
| 2011/0187634 A1* | 8/2011 | Kim | G09G 3/36 345/102 |
| 2011/0273377 A1* | 11/2011 | Merz | G09G 3/20 345/173 |

(Continued)

*Primary Examiner* — Jennifer Mehmood
*Assistant Examiner* — Carl Adams
(74) *Attorney, Agent, or Firm* — Jefferson IP Law, LLP (57) ABSTRACT

A user terminal and a display device thereof are provided. The display device includes a display panel including a glass plate for displaying an image by outputting light, and a polarizing plate attached to both a top surface and a bottom surface of the glass plate for exposing an edge portion of the glass plate, a cover window mounted on the display panel for transmitting the light, an adhesive sheet interposed between the display panel and the cover window and for adhering the cover window at the edge portion of the glass plate. The user terminal can be formed to have a small thickness and size, and light is shielded from being leaked to the outside of the user terminal via an edge portion of the display panel in the user terminal.

14 Claims, 6 Drawing Sheets

(56) References Cited

U.S. PATENT DOCUMENTS

2011/0304564 A1* 12/2011 Kim ................... G06F 3/044
                                                      345/173
2012/0013614 A1*  1/2012 Matsuhiro ............ G03B 35/26
                                                      345/419

* cited by examiner

USER TERMINAL AND DISPLAY DEVICE THEREOF

PRIORITY

This application claims the benefit under 35 U.S.C. §119 (a) of a Korean patent application filed on Sep. 2, 2011 in the Korean Intellectual Property Office and assigned Serial No. 10-2011-0088877, the entire disclosure of which is hereby incorporated by reference.

BACKGROUND OF THE INVENTION

1. Field of the Invention

The present invention relates to a user terminal. More particularly, the present invention relates to a display device of a user terminal.

2. Description of the Related Art

As various functions are added to user terminals, such as mobile terminals, mobile phones, personal computers, tablets, portable music players, digital cameras, and other similar electronic devices, the user terminals perform complex functions. In addition, the user terminal typically includes a display device. The display device displays various user data generated when performing functions in the user terminal. Here, a display area of the display device displays user data by outputting light in a central portion of the display area and shielding light in an edge portion of the display area. As a result of recent research, the display device has been developed so as to have a small size, light weight, and display a full color range with a high resolution.

However, a problem that light is not effectively shielded in a display device of a user terminal exists. This is because light is leaked to the outside of the display device from an edge portion of the display device. Further, a problem exists that an adhesion material, such as an adhesive tape, for adhering internal elements is exposed to a display area of user data in the display device of the user terminal. Thereby, in the user terminal, a display performance of the display device is deteriorated.

SUMMARY OF THE INVENTION

Aspects of the present invention are to address at least the above-mentioned problems and/or disadvantages and to provide at least the advantages described below. Accordingly, an aspect of the present invention is to provide a user terminal that can improve a display performance. Specifically, the present invention provides a user terminal that can more effectively shield light through a display device.

Another aspect of the present invention is to provide a user terminal that can prevent an adhesion material of an adhesive tape from being exposed through a display device.

In accordance with an aspect of the present invention, a display device of a user terminal is provided, the display device includes a display panel including a glass plate for displaying an image by outputting light, and a polarizing plate attached to both a top surface and a bottom surfaces of the glass plate for exposing an edge portion of the glass plate, a cover window mounted in on the display panel for transmitting the light; and an adhesive sheet interposed between the display panel and the cover window for adhering the cover window at the edge portion of the glass plate.

In accordance with an aspect of the present invention, user terminal is provided, the user terminal including a display panel including a glass plate for displaying an image by outputting light, and a polarizing plate attached to both a top surface and a bottom surface of the glass plate for exposing an edge portion of the glass plate, a touch panel mounted on the display panel for transmitting the light and for detecting a touch occurring at a surface of the touch panel, and an adhesive sheet interposed between the display panel and the touch panel for adhering the edge portion of the glass plate to the touch panel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
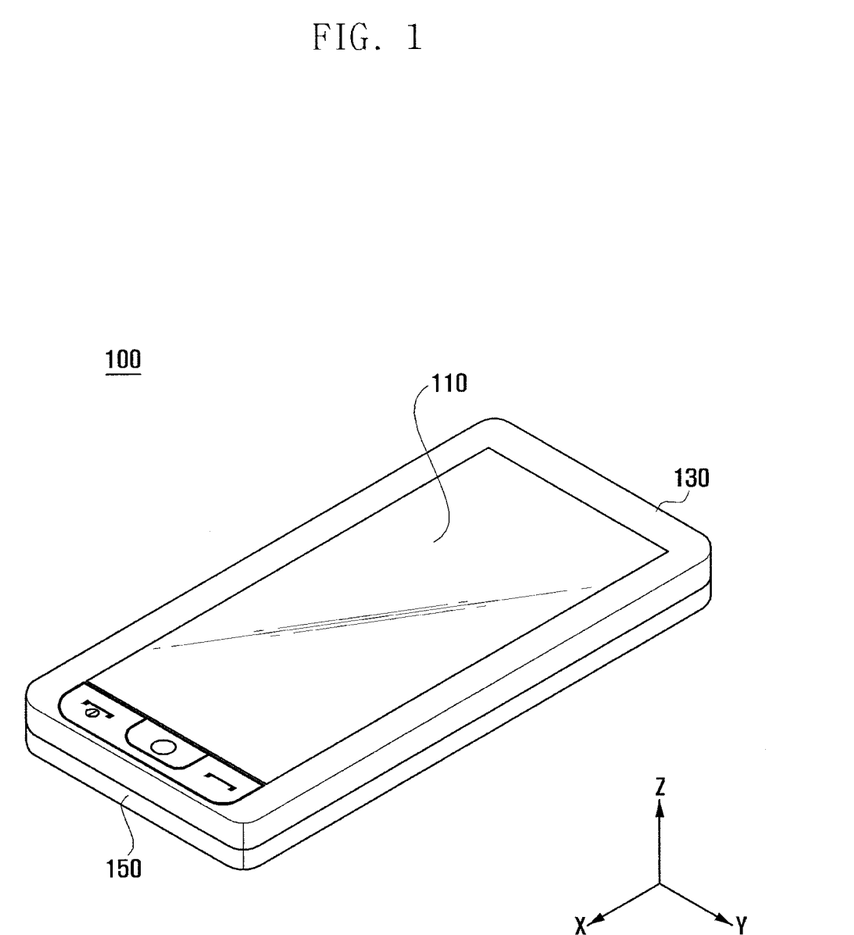
FIG. 1 is a perspective view illustrating a user terminal according to an exemplary embodiment of the present invention.

FIG. 1 is a perspective view illustrating a user terminal according to an exemplary embodiment of the present invention.

Figure 2:
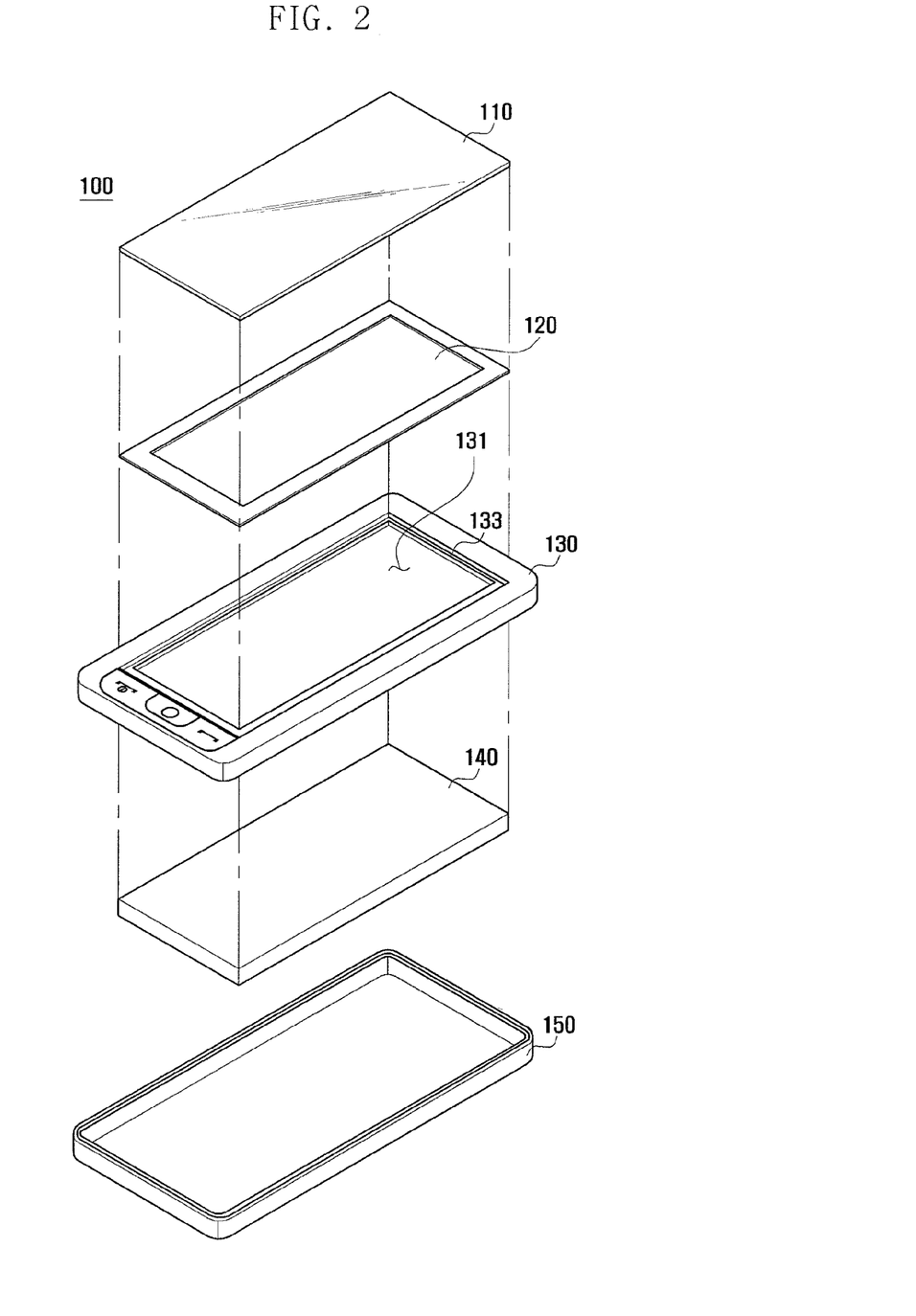
FIG. 2 is an exploded perspective view illustrating the user terminal of FIG. 1 according to an exemplary embodiment of the present invention.

FIG. 2 is an exploded perspective view illustrating the user terminal of FIG. 1 according to an exemplary embodiment of the present invention. In the present exemplary embodiment, it is assumed that the user terminal is a mobile phone.

Referring to FIGS. 1 and 2, a user terminal 100, according to the present exemplary embodiment, includes a touch panel 110, a cover adhesive sheet 120, a cover chassis 130, a display module 140, and a panel bracket 150.

The touch panel 110 protects internal elements of the user terminal 100. Additionally, the touch panel 110 allows for detection of a touch that has occurred on a surface thereof. In this case, the touch panel 110 can be formed to be a pressure sensitive type touch panel, such as a resistive type or a capacitive type touch panel. However, the present invention is not limited thereto, and the touch panel 110 may be any one of other suitable types of touch panels.

The cover adhesive sheet 120 couples elements of the user terminal 100. The cover adhesive sheet 120 adheres the touch panel 110, the cover chassis 130, and the display module 140 to each other. In this case, the cover adhesive sheet 120 is formed of tape, for example, Optical Clear Adhesive (OCA) or Super View Resin (SVR), and is formed to have a frame structure. However, aspects of the present invention are not limited thereto, and the cover adhesive sheet 120 may be formed of other suitable materials, and formed in other suitable shapes.

The cover chassis 130 protects internal elements of the touch panel 110 and the user terminal 100. The cover chassis 130 is formed so as to protect the internal elements of the user terminal 100 along at least one direction of the user terminal 100. Here, the cover chassis 130 may be formed of a synthetic resin, a metal material such as stainless steel or titanium (Ti), a mixture of materials, or any other suitable material. The cover chassis 130 is formed in a structure having a receiving hole 131 for receiving the touch panel 110 at a side of the cover chassis 130, and the cover adhesive sheet 120 is an intermediary for securing the touch panel 110 to the cover chassis 130. In this case, the cover chassis 130 includes a receipt stopper 133 that protrudes from an edge area of the receiving hole 131 to a central area for receiving the touch panel 110. Here, the receipt stopper 133 supports the touch panel 110 in a direction opposite to a direction in which the touch panel 110 is placed in the receiving hole 131. In other words, the receipt stopper 133 provides a ledge to support the touch panel 110 in the receiving hole 131 of the user terminal 100.

The display module 140 is an internal element of the user terminal 100 and performs a substantial function in the user terminal 100. In this case, the display module 140 performs a function of displaying an image. The display module 140 is received in the receiving hole 131 of the cover chassis 130. The display module 140 is received on a side of the cover chassis 130 that is opposite to a side of the cover chassis 130 that receives the touch panel 110. The display module 140 is protected by the touch panel 110 and the cover chassis 130. In this case, the display module 140 includes a Liquid Crystal Display (LCD) module and a Backlight Unit (BLU). However, the display module 140 is not limited thereto, and may include other suitable display modules, such as an Organic Light Emitting Diode (OLED) display module.

The panel bracket 150 performs a function of fixing a location of the internal elements of the user terminal 100. The panel bracket 150 fixes the display module 140 by supporting the display module 140. Additionally, the panel bracket 150 protects internal elements of the user terminal 100 together with the touch panel 110 and the cover chassis 130. In this case, the panel bracket 150 is formed to protect internal elements of the user terminal 100 along at least one direction of the user terminal 100. That is, the panel bracket 150 is fastened to the cover chassis 130 through an edge area so as to form an internal space by providing a perimeter for the internal elements of the user terminal 100.

Thereby, in the user terminal 100, the touch panel 110, the cover chassis 130, and the display module 140 are coupled together by the cover adhesive sheet 120. The internal space is formed by the touch panel 110, the cover chassis 130, and the panel bracket 150, and the display module 140 is received and protected inside the internal space.

Figure 3:
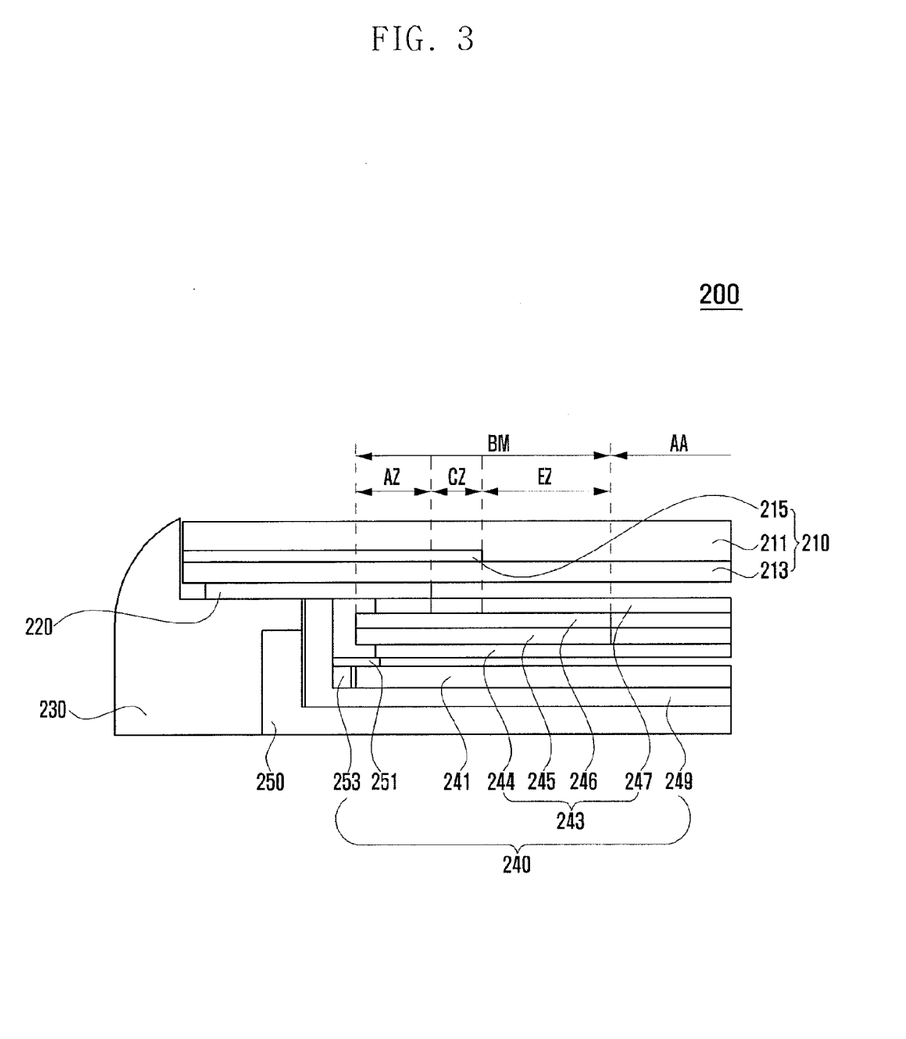
FIG. 3 is a cross-sectional view illustrating the user terminal of FIG. 1 according to an exemplary embodiment of the present invention.

FIG. 3 is a cross-sectional view illustrating the user terminal of FIG. 1 according to an exemplary embodiment of the present invention.

Figure 4:
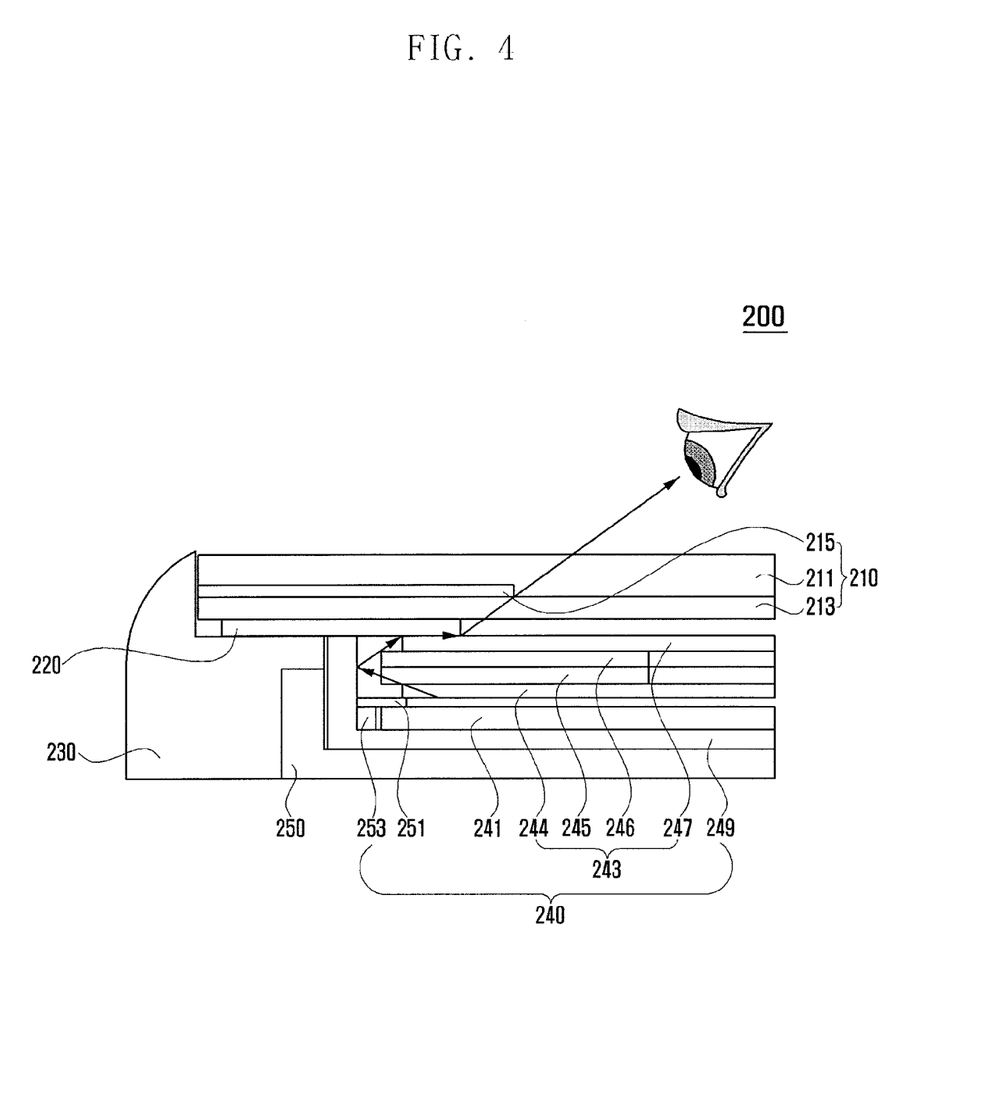
FIG. 4 is a diagram illustrating a light transfer path in the user terminal of FIG. 3 according to an exemplary embodiment of the present invention.

FIG. 4 is a diagram illustrating a light transfer path in the user terminal of FIG. 3 according to an exemplary embodiment of the present invention.

Referring to FIG. 3 and FIG. 4, in a user terminal 200 according to the present exemplary embodiment, a touch panel 210 is formed as a panel assembly. That is, the touch panel 210 includes a cover window 211, electrode sheet 213, and shield sheet 215. The cover window 211 is exposed to the outside of the user terminal 200. In other words, a top surface of the cover window 211 faces an inside of the user terminal 200 and a bottom surface of the cover window 211 faces an outside of the user terminal 200. In this case, a contact for a touch occurs on a surface of the cover window 211. The cover window 211 also transmits light from the inside of the user terminal 200 to the outside of the user terminal 200. The cover window 211 also transmits light arriving from the outside of the user terminal 200 to the inside of the user terminal 200.

The electrode sheet 213 is adhered to the bottom surface of the cover window 211. The electrode sheet 213 transmits light from the inside of the user terminal 200 to the outside of the user terminal 200. The electrode sheet 213 also transmits light arriving from the outside of the user terminal 200 to the inside of the user terminal 200. In the electrode sheet 213, a physical quantity, such as a resistance, a capacitance or another similar physical quantity, is changed according to a contact occurring on the surface of the cover window 211. Here, the electrode sheet 213 is a transparent conductive film having electrical conductivity and may be formed with Indium Tin Oxide (ITO) or any other suitable transparent conductive material. That is, the touch panel 210 detects a touch according to a change of a physical quantity in the electrode sheet 213.

The shield sheet 215 is interposed between the cover window 211 and the electrode sheet 213. The shield sheet 215 is disposed at an edge portion of the cover window 211 in order to expose a central portion of the cover window 211 and the electrode sheet 213. The shield sheet 215 blocks light originating from the inside of the user terminal 200 from being transmitted to the outside of the user terminal 200. Furthermore, the shield sheet 215 blocks light arriving from the outside of the user terminal 200 from being transmitted to the inside of the user terminal 200. Thereby, the shield sheet 215 provides a transmitting area for transmitting light arriving from a display module 240 in the touch panel 210 and a shield area for blocking light in a peripheral portion of the transmitting area. That is, the shield sheet 215 forms a shield area in the touch panel 210 and defines a transmitting area of the touch panel 210. Here, the shield sheet 215 is formed by patterning at a lower surface of the cover window 211. However, the present invention is not limited thereto, and the shield sheet 215 may be formed by other suitable processes and operations.

In the user terminal 200, according to the present exemplary embodiment, the display module 240 includes a light providing module 241, a display panel 243, a panel suspension 249, a module adhesive sheet 251, and a support module 253. In this case, the display module 240 is formed by sequentially stacking the panel suspension 249, the light providing module 241, and the display panel 243.

The light providing module 241 provides light. In this case, the light providing module 241 may be a BLU or any other suitable light providing module or unit. The light providing module 241 includes a light source (not shown) and a light guide plate (not shown) in order to generate and output light. Here, the light source may be a line light source, such as a Cold Cathode Fluorescent Lamp (CCFL) or a Hot Cathode Fluorescent Lamp (HCFL) and a point light source such as a Light Emitting Diode (LED). However, the present invention is not limited thereto, and other suitable light sources may be used. The light guide plate receives light from the light source and transfers light to the display panel 243. Here, the light guide plate is made of a plastic-based transparent material such as acryl. However, the present invention is not limited thereto, and the light guide plate may be made of a variety of suitable materials.

The display panel 243 is mounted on the light providing module 241 in the display module 240. In this case, the display panel 243 may be an LCD module. However, the present invention is not limited thereto, and the display panel 243 may be other suitable types of display modules or display types. The display panel 243 is partitioned into an active area AA and a black matrix BM. The active area AA corresponds to a central portion in the display panel 243. In the active area AA, the display panel 243 displays an image. That is, in the active area AA, the display panel 243 receives light from the light providing module 241, and allows light to pass through in order to output light and display an image. The black matrix BM corresponds to a peripheral portion of the active area AA and is disposed at an edge portion in the display panel 243. In the black matrix BM, the display panel 243 blocks light. In other words, in the display panel 243, the active area AA is defined by the black matrix BM.

In this case, the black matrix BM of the display panel 243 includes an adhesive zone AZ, a connecting zone CZ, and an exposure zone EZ. The adhesive zone AZ is an area contacting a cover adhesive sheet 220 in the display panel 243. In this case, the adhesive zone AZ corresponds to a shield area of the touch panel 210 and the black matrix BM of the display panel 243. The exposure zone EZ is an area extending from a boundary between a transmitting area and a shield area of the touch panel 210 to a boundary of the active area AA and the black matrix BM of the display panel 243. That is, the exposure zone EZ corresponds to the transmitting area of the touch panel 210 and the active area AA of the display panel 243. The connection zone CZ is an area connecting the adhesive zone AZ and the exposure zone EZ. In this case, the connection zone CZ corresponds to a shield area of the touch panel 210 and the active area AA of the display panel 243.

Furthermore, the display panel 243 includes a lower polarizing plate 244, a lower glass plate 245, an upper glass plate 246, and an upper polarizing plate 247. Here, although not shown, a liquid crystal layer is formed between the lower glass plate 245 and the upper glass plate 246.

The lower polarizing plate 244 is disposed on an upper surface of the light providing module 241. The lower polarizing plate 244 passes through only specific polarized light of light output from the light providing module 241 and absorbs or shields the remaining light.

The lower glass plate 245 is disposed on an upper surface of the lower polarizing plate 244. In this case, the lower glass plate 245 changes light transmittance of light output from the light providing module 241. The lower glass plate 245 controls polarized light passing through the lower polarizing plate 244 in a desired shape by changing an arrangement of liquid crystal in the liquid crystal layer formed between the lower glass plate 245 and the upper glass plate 246. Here, the lower glass plate 245 is formed with, for example, a Thin Film Transistor (TFT) substrate. However, the present invention is not limited thereto, and the lower glass plate 245 may be formed with other suitable substrates and materials.

The upper glass plate 246 is disposed on an upper surface of the lower glass plate 245. In this case, the upper glass plate 246 provides light that has passed through the liquid crystal in the liquid crystal layer of a predetermined color. Here, the upper glass plate 246 is formed with, for example, a Color/Filter (C/F) substrate. That is, the upper glass plate 246 is formed with a plurality of Red, Green, and Blue (RGB) pixels, for exhibiting light of a predetermined color. However, the present invention is not limited thereto, and the upper glass plate 246 may be formed of other suitable light exhibiting elements.

The upper polarizing plate 247 is disposed on an upper surface of the upper glass plate 246. In this case, the upper polarizing plate 247 is adhered to the cover adhesive sheet 220 at an edge portion of the upper polarizing plate 247. That is, the upper polarizing plate 247 contacts the cover adhesive sheet 220 in the adhesive zone AZ of the display panel 243. Thereby, the display module 240 is coupled to the touch panel 210 and a cover chassis 230 through the cover adhesive sheet 220. The upper polarizing plate 247 passes through light provided from the upper glass plate 246. However, the upper polarizing plate 247 passes through only specific polarized light from among light arriving from the outside of the user terminal 200 and absorbs or blocks the remaining light from among the light arriving from the outside of the user terminal 200.

The panel suspension 249 is mounted on a lower surface of the light providing module 241 and supports the light providing module 241. The panel suspension 249 increases the strength of the display module 240. That is, the panel suspension 249 receives and protects the light providing module 241, the display panel 243, the module adhesive sheet 251, and the support module 253.

The module adhesive sheet 251 couples elements of the display module 240. The module adhesive sheet 251 couples the light providing module 241, the display panel 243, and the support module 253 to each other by adhesion. In this case, the module adhesive sheet 251 is interposed between the light providing module 241 and the lower polarizing plate 244. The module adhesive sheet 251 is disposed at an edge portion of the lower polarizing plate 244. That is, the module adhesive sheet 251 contacts the lower polarizing plate 244 at the adhesive zone AZ of the display panel 243. Here, the module adhesive sheet 251 is formed of a tape having a frame structure, for example OCA or SVR. However, the present invention is not limited thereto, and the module adhesive sheet 251 may be formed of other suitable materials.

The support module 253 provides a flat degree or angle of the module adhesive sheet 251. The support module 253 is mounted on the panel suspension 249 and is supported by the panel suspension 249. The support module 253 is disposed at a peripheral portion of the light providing module 241, is adhered to the module adhesive sheet 251 together with the light providing module 241, and supports the module adhesive sheet 251. Here, it is preferable that the support module 253 is formed to be the same thickness as that of the light providing module 241. That is, the support module 253 is adhered to the light providing module 241, thereby providing a flat degree or angle of the module adhesive sheet 251. In other words, the support module 253 allows for the module adhesive sheet 251 to lay flat.

The panel bracket 250 fixes the display module 240 by supporting the display module 240. Additionally, the panel bracket 250 protects internal elements of the user terminal 200 together with the touch panel 210 and the cover chassis 230. In this case, the panel bracket 250 is formed to protect internal elements of the user terminal 200 along at least one direction of the user terminal 200. That is, the panel bracket 250 is fastened to the cover chassis 230 through an edge area so as to form an internal space by providing a perimeter for the internal elements of the user terminal 200.

In this case, in the user terminal 200, according to the present exemplary embodiment, the cover adhesive sheet 220 adheres the touch panel 210 to the display module 240. In this case, the cover adhesive sheet 220 contacts the upper polarizing plate 247 of the display panel 243. Thereby, a space having a height corresponding to a thickness of the cover adhesive sheet 220 is formed between the touch panel 210 and the display module 240. Furthermore, in the display module 240, the module adhesive sheet 251 adheres the light providing module 241 to the display panel 243. In this case, the module adhesive sheet 251 contacts the lower polarizing plate 244 of the display panel 243. Thereby, a space having a height corresponding to a thickness of the module adhesive sheet 251 is formed between the light providing module 241 and the display panel 243.

Thereby, as shown in FIG. 4, in the user terminal 200, light is leaked to the outside through an edge portion of the user terminal 200. That is, light provided in the light providing module 241 travels into a space formed between a side surface of the display panel 243 or the lower polarizing plate 244 and the panel suspension 249 through a space formed by the module adhesive sheet 251. Thereafter, corresponding light travels into a space formed by the cover adhesive sheet 220 and the corresponding light is transmitted to the outside through the touch panel 210. Thereby, in the user terminal 200, light is not effectively blocked from escaping. Furthermore, in the user terminal 200, an adhesion material of the cover adhesive sheet 220 is spread to the active area AA of the display panel 243 and is exposed to the outside through the touch panel 210. Accordingly, in the user terminal 200, a display performance may be deteriorated.

Figure 5:
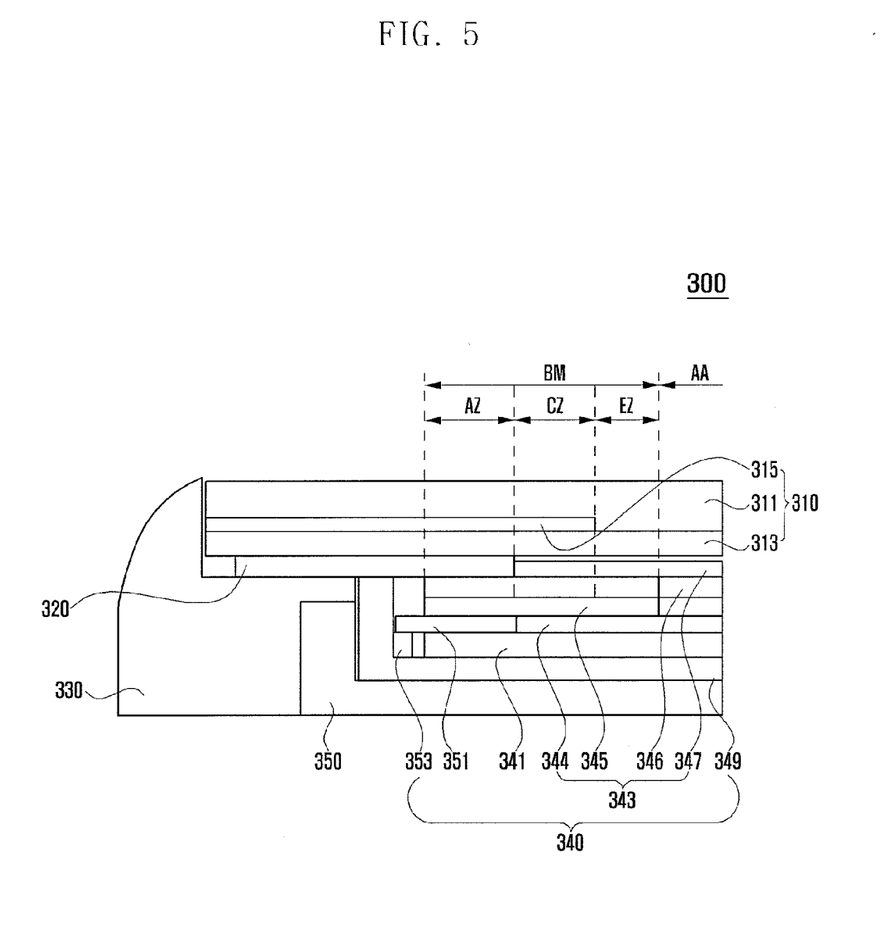
FIG. 5 is a cross-sectional view illustrating a user terminal according to another exemplary embodiment of the present invention.

FIG. 5 is a cross-sectional view illustrating a user terminal according to another exemplary embodiment of the present invention.

Figure 6:
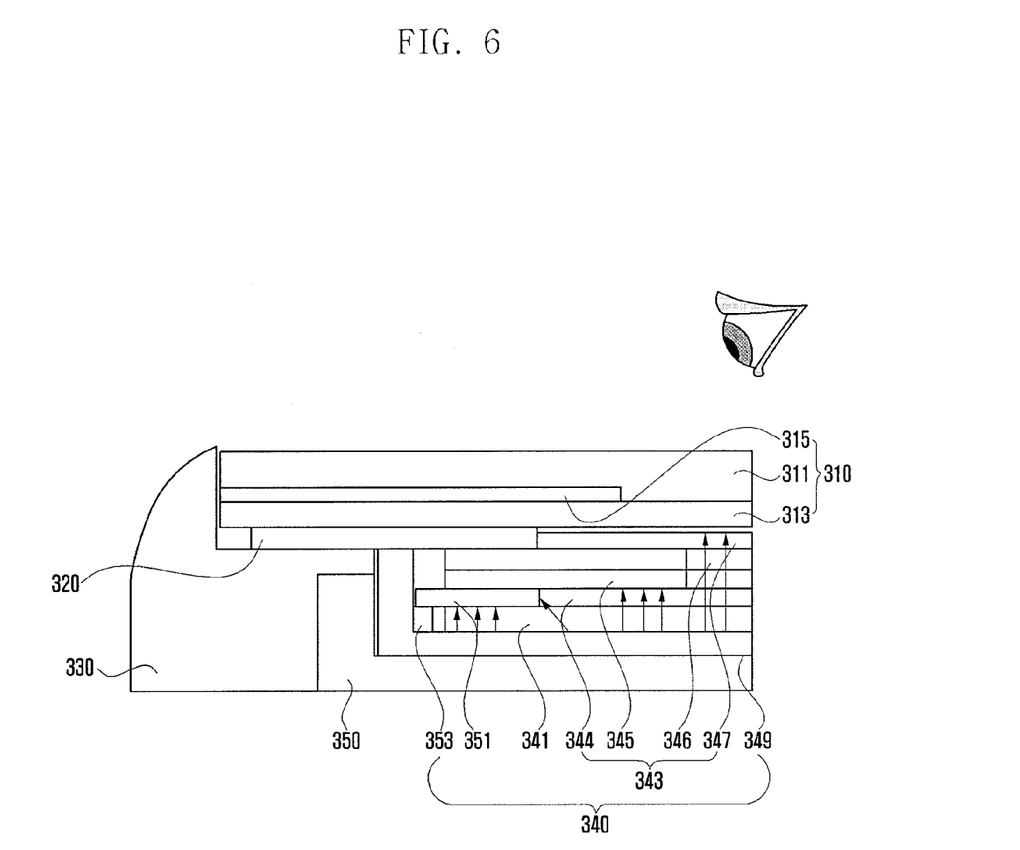
FIG. 6 is a diagram illustrating a light transfer path in the user terminal of FIG. 5 according to an exemplary embodiment of the present invention.

FIG. 6 is a diagram illustrating a light transfer path in the user terminal of FIG. 5 according to another exemplary embodiment of the present invention.

Referring to FIG. 5 and FIG. 6, in a user terminal 300, according to the present exemplary embodiment, a touch panel 310 is formed as a panel assembly. That is, the touch panel 310 includes a cover window 311, an electrode sheet 313, and a shield sheet 315. In this case, the touch panel 310 is formed as in the exemplary embodiment of FIG. 3, and therefore a detailed description thereof is omitted.

In the user terminal 300 according to the present exemplary embodiment, a display module 340 includes a light providing module 341, a display panel 343, a panel suspension 349, a module adhesive sheet 351, and a support module 353. The display module 340 is formed by sequentially stacking the panel suspension 349, the light providing module 341, and the display panel 343.

The light providing module 341 provides light and may be a BLU or any other suitable element providing light. The light providing module 341 includes a light source (not shown) and a light guide plate (not shown). The light source generates and outputs light and may include a line light source, such as a cold cathode light source or a hot cathode light source, and a point light source, such as an LED. The light guide plate receives light from the light source and transfers the light to the display panel 343. Here, the light guide plate is formed of a plastic-based transparent material such as acryl. However, the present invention is not limited thereto, and the light guide plate may be formed of any suitable material.

The display panel 343 is mounted on the light providing module 341 in the display module 340. In this case, the display panel 343 may be an LCD module or any other suitable display unit or module. The display panel 343 is partitioned into an active area AA and a black matrix BM. The active area AA corresponds to a central portion in the display panel 343. In the active area AA, the display panel 343 displays an image. That is, in the active area AA, the display panel 343 receives and passes through light from the light providing module 341, outputs light, and displays an image. The black matrix BM corresponds to a peripheral portion of the active area AA and is disposed at an edge portion of the display panel 343. In the black matrix BM, the display panel 343 blocks light. That is, in the display panel 343, the active area AA is defined by the perimeter formed by the black matrix BM.

In this case, in the display module 340, the black matrix BM of the display panel 343 includes an adhesive zone AZ, a connection zone CZ, and an exposure zone EZ. The adhesive zone AZ corresponds to an area contacting a cover adhesive sheet 320 in the display panel 343. In this case, the adhesive zone AZ is a shielded area of the touch panel 310 and the black matrix BM of the display panel 343. The exposure zone EZ is an area from a boundary between a transmitting area and a shield area of the touch panel 310 to a boundary between the active area AA and the black matrix BM of the display panel 343. That is, the exposure zone EZ corresponds to a transmitting area of the touch panel 310 and the active area AA of the display panel 343. The connection zone CZ corresponds to an area that connects the adhesive zone AZ and the exposure zone EZ. In this case, the connection zone CZ corresponds to a shielded area of the touch panel 310 and the active area AA of the display panel 343.

Furthermore, the display panel 343 includes a lower polarizing plate 344, a lower glass plate 345, an upper glass plate 346, and an upper polarizing plate 347. Although not shown, a liquid crystal layer is formed between the lower glass plate 345 and the upper glass plate 346.

The lower polarizing plate 344 is disposed on an upper surface of the light providing module 341. In this case, the lower polarizing plate 344 only passes through specific polarized light of light output from the light providing module 341 and absorbs or shields the remaining light.

The lower glass plate 345 is disposed on an upper surface of the lower polarizing plate 344. In this case, an edge portion of the lower glass plate 345 is exposed by the lower polarizing plate 344. The lower glass plate 345 changes light transmittance of light output from the light providing module 341. For this, the lower glass plate 345 controls polarized light passing through the lower polarizing plate 344 in a desired shape by changing an arrangement of liquid crystal in a liquid crystal layer. Here, the lower glass plate 345 is formed with a TFT substrate. However, the present invention is not limited thereto, and the lower glass plate 345 may be formed of other suitable substrates or materials.

The upper glass plate 346 is disposed on an upper surface of the lower glass plate 345. In this case, the upper glass plate 346 is adhered to the cover adhesive sheet 320 through an edge portion of the upper glass plate 346. That is, the upper glass plate 346 contacts the cover adhesive sheet 320 in the adhesive zone AZ of the display panel 343. Thereby, the display module 340 is coupled to the touch panel 310 and a cover chassis 330 through the cover adhesive sheet 320. The upper glass plate 346 provides light passing through the liquid crystal in the liquid crystal layer of a predetermined color. Here, the upper glass plate 346 is formed with the color filter substrate. That is, the upper glass plate 346 is formed with a plurality of RGB pixels, i.e. red pixels, green pixels, and blue pixels for exhibiting light of a predetermined color. However, the present invention is not limited thereto, and the upper glass plate 346 may be formed of other suitable elements for exhibiting light of a predetermined color.

The upper polarizing plate 347 is disposed on an upper surface of the upper glass plate 346. In this case, the upper polarizing plate 347 exposes an edge portion of the upper glass plate 346. The upper polarizing plate 347 passes through light provided in the upper glass plate 346. However, the upper polarizing plate 347 passes through only specific polarized light from among light arriving at the outside of the user terminal 300 and absorbs or shields the remaining light from among light arriving at the outside of the user terminal 300.

The panel suspension 349 is mounted on a lower surface of the light providing module 341 and supports the light providing module 341. The panel suspension 349 increases the strength of the display module 340. That is, the panel suspension 349 receives and protects the light providing module 341, the display panel 343, the module adhesive sheet 351, and the support module 353.

The module adhesive sheet 351 couples elements of the display module 340. The module adhesive sheet 351 couples the light providing module 341, the display panel 343, and the support module 353 to each other by adhesion. In this case, the module adhesive sheet 351 is interposed between the light providing module 341 and the lower glass plate 345. The module adhesive sheet 351 is disposed at an edge portion of the lower glass plate 345. That is, the module adhesive sheet 351 contacts the lower glass plate 345 at the adhesive zone AZ of the display panel 343. Here, the module adhesive sheet 351 is formed of a tape having a frame structure, for example, an OCA or an SVR. However, the present invention is not limited thereto, and the module adhesive sheet 351 may be formed of other suitable materials.

The support module 353 provides a flat degree or angle of the module adhesive sheet 351. The support module 353 is mounted on the panel suspension 349 and is supported by the panel suspension 349. The support module 353 is disposed at a peripheral portion of the light providing module 341, is adhered at the module adhesive sheet 351 together with the light providing module 341, and supports the module adhesive sheet 351. Here, the support module 353 is preferably formed to be the same thickness as that of the light providing module 341. That is, the support module 353 is adhered to the light providing module 341, thereby providing a flat degree or angle of the module adhesive sheet 351. In other words, the support module 353 allows for the module adhesive sheet 351 to lay flat.

The panel bracket 350 fixes the display module 340 by supporting the display module 340. Additionally, the panel bracket 350 protects internal elements of the user terminal 300 together with the touch panel 310 and the cover chassis 330. In this case, the panel bracket 350 is formed to protect internal elements of the user terminal 300 along at least one direction of the user terminal 300. That is, the panel bracket 350 is fastened to the cover chassis 330 through an edge area so as to form an internal space by providing a perimeter for the internal elements of the user terminal 300.

In this case, in the user terminal 300 according to the present exemplary embodiment, the cover adhesive sheet 320 adheres the touch panel 310 to the display module 340. In this case, the cover adhesive sheet 320 contacts the upper glass plate 346 of the display panel 343. Thereby, a space having a narrow width is formed between the touch panel 310 and the display module 340 as compared with the exemplary embodiment of FIG. 3. That is, a separation distance between the touch panel 310 and the display module 340 is reduced. Here, the cover adhesive sheet 320 provides a flat degree or angle in order to prevent the touch panel 310 and the display module 340 from contacting each other.

Furthermore, in the display module 340, the module adhesive sheet 351 adheres the light providing module 341 and the display panel 343 together. In this case, the module adhesive sheet 351 contacts the lower glass plate 345 of the display panel 343. Thereby, a space having a narrow width is formed between the light providing module 341 and the display panel 343 as compared with the exemplary embodiment of FIG. 3, or alternatively, a space is not formed between the light providing module 341 and the display panel 343. In other words, a separation distance between the light providing module 341 and the display panel 343 is reduced. Accordingly, as a width between the touch panel 310 and the display module 340 becomes narrow, and a width between the light providing module 341 and the display panel 343 becomes narrow, the user terminal 300 can be formed to have a small thickness and size.

Thereby, in the user terminal 300, light is shielded from being leaked to the outside through an edge portion of the user terminal, as shown in FIG. 6. That is, the module adhesive sheet 351 separates a space formed between the light providing module 341 and the display panel 343 from a space formed between a side surface of the display panel 343 and the panel suspension 349. Thereby, even if light provided in the light providing module 341 travels into a space formed by the module adhesive sheet 351, corresponding light is suppressed from traveling into the space formed between a side surface of the display panel 343 and the panel suspension 349. The cover adhesive sheet 320 separates the space formed between the side surface of the display panel 343 and the panel suspension 349 from a space formed between the touch panel 310 and the display module 340. Thereby, even if light provided in the light providing module 341 travels into the space formed between the side surface of the display panel 343 and the panel suspension 349, corresponding light is suppressed from traveling into the space formed between the touch panel 310 and the display module 340. In other words, light is effectively blocked inside the user terminal 300. Furthermore, in the user terminal 300, even if an adhesion material of the cover adhesive sheet 320 is spread to the active area AA of the display panel 343, a corresponding adhesion material is prevented from being exposed to the outside through the touch panel 310. Accordingly, in the user terminal 300, a display performance can be improved.

In the foregoing exemplary embodiments, a user terminal which is formed as a touch panel and a display module are coupled using a cover adhesive sheet as an intermediary as described, however the present invention is not limited thereto. That is, even if a cover window having an attached shield sheet and a display module are coupled using a cover adhesive sheet as an intermediary, the present invention can be exemplarily embodied.

According to the present invention, in the user terminal, as an adhesive tape contacts with a glass plate of a display panel, a separation distance between a cover window and a display panel is reduced. Thereby, the user terminal can be formed to have a small thickness and size. In addition, in the user terminal, light can be shielded from being leaked to the outside of the user terminal through an edge portion of the display panel. Furthermore, in the user terminal, an adhesion material of an adhesive tape is prevented from being exposed to outside the user terminal. That is, in the user terminal, a display performance can be improved.

In a user terminal and a display device thereof, according to the present exemplary embodiments, as an adhesive tape contacts a glass plate of a display panel, a separation distance between a cover window and a display panel is reduced. Thereby, the user terminal can be formed to have a small thickness and size. Furthermore, light is shielded from being leaked to the outside through an edge portion of the display panel in the user terminal. Furthermore, in the user terminal, an adhesion material of an adhesive tape is prevented from being exposed to outside the user terminal. That is, in the user terminal, a display performance can be improved.

While the present invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A display device of a user terminal, the display device comprising:
   a touch panel; and
   a display module, the display module comprising:
      a lower glass plate configured to display an image by transmitting light,
      a light providing module configured to provide light to the lower glass plate, the light providing module including a light source and a light guiding plate,
      a lower polarizing plate disposed between the lower glass plate and the light providing module, the lower polarizing plate extending in a plane parallel to the lower glass plate and the light providing module, respective edge portions of the lower glass plate and the light providing module extending beyond an edge of the lower polarizing plate, and
      a modular adhesive sheet disposed on the plane of the lower polarizing plate, the modular adhesive sheet extending beyond the respective edge portions of the lower glass plate and the light providing module and being disposed directly between the respective edge portions of the lower glass plate and the light providing module to adhere to both the lower glass plate and the light providing module.

2. The display device of claim 1, further comprising:
   a support module disposed below the modular adhesive sheet and adjacent to a peripheral edge of the light providing module.

3. The display device of claim 2, wherein a first edge of the modular adhesive sheet is adhered to the support module and a second edge of the modular adhesive sheet is adhered to the light providing module.

4. The display device of claim 1,
   wherein the lower glass plate comprises an active area configured to transmit the light and a shield area configured to define the active area by blocking the light in a peripheral portion of the active area, and
   wherein the active area contacts the modular adhesive sheet at an edge portion of the shield area.

5. The display device of claim 4, wherein the shield area is a black matrix comprising:
   an adhesive zone contacting the modular adhesive sheet;
   an exposure zone exposing a portion of the display panel; and
   a connection zone disposed between the adhesive zone and the exposure zone.

6. The display device of claim 1, wherein the modular adhesive sheet is formed to have a size as an upper surface of the light providing module in contact with the support module.

7. The display device of claim 1, wherein the lower polarizing plate is disposed on an upper surface of the light providing module.

8. The display device of claim 1, wherein the module adhesive sheet and the lower polarizing plate together cover an entire upper surface of the light providing module.

9. A display device of a user terminal, the display device comprising:
   a display panel configured to display an image, the display panel comprising a lower polarizing plate, a lower glass plate, an upper glass plate, and an upper polarizing plate;
   a touch panel disposed on the display panel and configured to detect a touch occurring at a surface of the touch panel; and
   a cover adhesive sheet disposed on a same plane as the upper polarizing plate, the cover adhesive sheet being disposed directly between the upper glass plate of the display panel and the touch panel, to adhere to both the display panel and the touch panel, such that light being provided from a light providing module is shielded from being leaked to an outside of the user terminal through an edge portion of the display panel,
   wherein the upper polarizing plate is disposed between the upper glass plate and the touch panel, the upper polarizing plate extending in a plane parallel to the upper glass plate and the touch panel, an edge portion of the upper glass plate extending beyond an edge of the upper polarizing plate.

10. The display device of claim 9, wherein a thickness of the cover adhesive sheet is greater than a thickness of the upper polarizing plate.

11. A display device of a user terminal, the display device comprising:

a display panel configured to display an image, the display panel comprising:
  a glass plate configured to display an image by transmitting light, the glass plate including a lower glass plate and a upper glass plate,
  a light providing module configured to provide light to the lower glass plate, the light providing module including a light source and a light guiding plate,
  a lower polarizing plate disposed between the lower glass plate and the light providing module, the lower polarizing plate extending in a plane parallel to the lower glass plate and the light providing module, respective edge portions of the lower glass plate and the light providing module extending beyond an edge of the lower polarizing plate, and
  a modular adhesive sheet disposed on the same plane as the lower polarizing plate, the modular adhesive sheet extending beyond the respective edge portions of the lower glass plate and the light providing module and being disposed directly between the respective edge portions of the lower glass plate and the light providing module, to adhere to both the lower glass plate and the light providing module;
a touch panel disposed on the display panel and configured to detect a touch occurring at a surface of the touch panel;
a cover adhesive sheet disposed next to the upper glass plate, the cover adhesive sheet being disposed directly between the upper glass plate of the display panel and the touch panel, to adhere to both the display panel and the touch panel; and
an upper polarizing plate disposed between upper glass plate of the display panel and the touch panel, the upper polarizing plate extending in a plane parallel to the upper glass plate and the touch panel, an edge portion of the upper glass plate extending beyond an edge of the upper polarizing plate.

12. The display device of claim 11, further comprising:
  a support module disposed below the modular adhesive sheet and adjacent to a peripheral edge of the light providing module.

13. A display device configured to display an image, the display device comprising:
  a display panel configured to display an image, the display panel comprising:
    a lower glass plate,
    an upper glass plate,
    a light providing module,
    a modular adhesive sheet disposed directly between the lower glass plate and the light providing module to adhere to both the lower glass plate and the light providing module, the modular adhesive sheet extending beyond respective edge portions of the lower glass plate and the light providing module, and
    a lower polarizing plate disposed between the lower glass plate and the light providing module, the lower polarizing plate extending in a plane parallel to the lower glass plate and the light providing module, respective edge portions of the lower glass plate and the light providing module extending beyond an edge of the lower polarizing plate;
  a touch panel disposed on the display panel and configured to detect a touch occurring at a surface of the touch panel; and
  a cover adhesive sheet disposed directly between the display panel and the touch panel to adhere to both the display panel and the touch panel at an edge portion of the display panel.

14. The display device of claim 13, further comprising:
  a support module having a thickness substantially equal to a thickness of the light providing module and disposed below the modular adhesive sheet, on a same plane as the light providing module, and adjacent to a peripheral edge of the light providing module.

* * * * *